(12) United States Patent
Cho et al.

(10) Patent No.: US 10,999,610 B2
(45) Date of Patent: May 4, 2021

(54) SERVICE METHOD AND SYSTEM FOR PROVIDING MULTI-TRACK VIDEO CONTENTS

(71) Applicant: NAVER CORPORATION, Seongnam-Si (KR)

(72) Inventors: Sung Tak Cho, Seongnam-si (KR);
Kyung-Ryul Sun, Seongnam-si (KR);
Sungho Kim, Seongnam-si (KR);
Yoosub Song, Seongnam-si (KR);
Joon-Kee Chang, Seongnam-si (KR);
Haneul Lee, Seongnam-si (KR);
Kukhwan Seo, Seongnam-si (KR);
Seongcheol Jo, Seongnam-si (KR);
Seungahe Yi, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 443 days.

(21) Appl. No.: 14/568,967

(22) Filed: Dec. 12, 2014

(65) Prior Publication Data

US 2015/0288993 A1      Oct. 8, 2015

(30) Foreign Application Priority Data

Apr. 7, 2014    (KR) .................. 10-2014-0041020

(51) Int. Cl.
*H04N 21/236*     (2011.01)
*H04N 21/235*     (2011.01)
(Continued)

(52) U.S. Cl.
CPC ... *H04N 21/2353* (2013.01); *H04N 21/44016* (2013.01); *H04N 21/8456* (2013.01); *H04N 21/47217* (2013.01)

(58) Field of Classification Search
None
See application file for complete search history.

(56) References Cited

U.S. PATENT DOCUMENTS 4,872,151 A  * 10/1989  Smith .................. G11B 7/0037
                                                     360/72.1
5,119,353 A  *  6/1992  Asakura ................ A63F 13/10
                                                     369/13.01
(Continued)

FOREIGN PATENT DOCUMENTS

CN       101184209 A      5/2008
JP      2000341669 A     12/2000
(Continued)

OTHER PUBLICATIONS

Korean Office Action dated Mar. 9, 2015 issued in corresponding Korean Application No. 10-2014-0041020.
(Continued)

*Primary Examiner* — Nasser M Goodarzi
*Assistant Examiner* — Terrika Peterson
(74) *Attorney, Agent, or Firm* — Harness, Dickey & Pierce, P.L.C.

(57) ABSTRACT

Methods and systems for providing multi-track video content includes, receiving a user request for multi-track video, the multi-track video including a plurality of videos, each of the plurality of videos corresponding to a track, each of the plurality of videos being divided into time-based video segments; requesting a first video of the plurality of videos, the first video corresponding to a first track of the multi-track video; receiving first video segments corresponding to the first video; sequentially transferring the first video segments to a player for displaying the sequentially transferred first video segments; receiving second video segments of a second video of the plurality of videos instead of receiving the first video segments, the second video segments corre-
(Continued)

sponding to a second track of the multi-track video; and sequentially transferring the second video segments to the player for displaying the sequentially transferred second video segments.

18 Claims, 11 Drawing Sheets

(51) Int. Cl.
    *H04N 21/44*     (2011.01)
    *H04N 21/845*     (2011.01)
    *H04N 21/472*     (2011.01)

(56) References Cited

U.S. PATENT DOCUMENTS

| | | | | |
|---|---|---|---|---|
| 6,833,848 | B1* | 12/2004 | Wolff | G06F 17/30056 707/E17.009 |
| 9,021,118 | B2* | 4/2015 | John | G06F 17/214 709/231 |
| 2006/0031054 | A1* | 2/2006 | Nace | G06F 11/3419 703/13 |
| 2007/0025194 | A1* | 2/2007 | Morse | G11B 27/034 369/30.1 |
| 2007/0266399 | A1* | 11/2007 | Sidi | H04N 5/4401 725/42 |
| 2007/0271273 | A1* | 11/2007 | Cradick | G06F 11/3636 |
| 2008/0243278 | A1* | 10/2008 | Dalton | H04S 7/304 700/94 |
| 2009/0282162 | A1* | 11/2009 | Mehrotra | H04L 65/607 709/233 |
| 2010/0114921 | A1* | 5/2010 | Bocharov | H04L 29/06027 707/758 |
| 2011/0219098 | A1* | 9/2011 | Xu | H04L 67/06 709/219 |
| 2011/0264530 | A1* | 10/2011 | Santangelo | G06Q 30/02 705/14.64 |
| 2012/0117183 | A1* | 5/2012 | Wong | H04L 63/101 709/217 |
| 2012/0144416 | A1* | 6/2012 | Wetzer | H04N 21/25816 725/14 |
| 2012/0210378 | A1* | 8/2012 | McCoy | H04N 21/422 725/109 |
| 2012/0271882 | A1* | 10/2012 | Sachdeva | H04N 21/26258 709/204 |
| 2013/0031594 | A1* | 1/2013 | Sansom | G06F 17/3082 725/114 |
| 2013/0110978 | A1* | 5/2013 | Gordon | H04N 21/2665 709/218 |
| 2013/0195427 | A1* | 8/2013 | Sathish | H04N 5/91 386/248 |
| 2014/0115647 | A1* | 4/2014 | Kim | H04N 21/6125 725/110 |
| 2014/0237521 | A1* | 8/2014 | Rothschild | H04N 21/236 725/88 |
| 2014/0351450 | A1* | 11/2014 | Lamouchi | H04L 47/29 709/230 |
| 2016/0065884 | A1* | 3/2016 | Di Censo | H04N 5/765 386/227 |
| 2016/0182627 | A1* | 6/2016 | Navanageri | H04L 67/1095 709/219 |
| 2016/0203010 | A1* | 7/2016 | Azizian | G06F 19/3437 703/23 |

FOREIGN PATENT DOCUMENTS

| | | |
|---|---|---|
| JP | 2004274619 A | 9/2004 |
| JP | 2010504044 A | 2/2010 |
| JP | 2012138962 A | 7/2012 |
| JP | 2013183209 A | 9/2013 |
| JP | 2013535884 A | 9/2013 |
| JP | 2014053875 A | 3/2014 |
| KR | 20050121345 A | 12/2005 |
| KR | 101350915 B1 | 2/2014 |
| KR | 1020140031929 A | 3/2014 |
| WO | WO-2008015753 A1 | 2/2008 |

OTHER PUBLICATIONS

Japanese Office Action dated Dec. 6, 2016 for corresponding Japanese Patent Application No. 2014-219906.
Chinese Office Action dated Sep. 1, 2017 for corresponding Chinese Patent Application No. 201410569225.9.
Japanese Office Action dated Mar. 29, 2016, issued in corresponding Japanese Application No. 2014-219906.

* cited by examiner

Based on video content having longest play time (Track 3)

SERVICE METHOD AND SYSTEM FOR PROVIDING MULTI-TRACK VIDEO CONTENTS

CROSS-REFERENCE TO RELATED APPLICATION

This application claims priority from and the benefit of Korean Patent Application No. 10-2014-0041020, filed on Apr. 7, 2014, which is hereby incorporated by reference in its entirety for all purposes as if fully set forth herein.

BACKGROUND

Field

Example embodiments relate to a multi-track video content service method and system for providing multi-track video content.

Description of the Background

Conventional video content has been provided to users by recording an image edited during a creation process and by playing the image using a single screen. However, a plurality of images may be provided with respect to single content item.

For example, a device and method for video media recording and playing with multiple tracks is disclosed in Korean Patent Publication No. 10-2005-0121345, published on Dec. 27, 2005. However, in the related art, each of a plurality of videos already recorded for single video content is played by simply configuring a plurality of screens. Accordingly, a relatively large amount of traffic is used for a streaming service of video content including multiple tracks according to the related art. For example, when single video content includes a number N of videos, about N times the amount of traffic are likely to be used when compared to video content including a single video.

Furthermore, multiple tracks of the related art may provide a plurality of videos captured with respect to single content at the same time, and thus, the systems and methods of the related art may not switch and thereby provide a plurality of contents in the same manner as single content.

SUMMARY

At least one example embodiments relates to a multi-track video content service method performed by a terminal.

According to at least one example embodiment, a multi-track video content service method performed by a terminal includes, receiving, by the terminal, a user request for multi-track video, the multi-track video including a plurality of videos, each of the plurality of videos corresponding to a track, each of the plurality of videos being divided into time-based video segments; requesting, by the terminal, a first video of the plurality of videos, the first video corresponding to a first track of the multi-track video; receiving, by the terminal, first video segments corresponding to the first video; sequentially transferring, by the terminal, the first video segments to a player for displaying the sequentially transferred first video segments; receiving, by the terminal, second video segments of a second video of the plurality of videos instead of receiving the first video segments, the second video segments corresponding to a second track of the multi-track video; and sequentially transferring, by the terminal, the second video segments to the player for displaying the sequentially transferred second video segments.

At least one example embodiment provides that each of the plurality of videos includes a start point and an end point and the video segments of each of the plurality of videos are synchronized according to a play order, and in response to a selection of the second track at the player, the sequentially transferred second video segments of the second track are continuously played at a start point of the second video, the continuously playing including transitioning from an end point of a currently played segment of the first video segments when the currently played segment is completed to the start point of the second video.

At least one example embodiment provides that history information about a transition between the first track and the second track is stored in a metadata format, and the method further includes generating a link for accessing at least the first track and the second track, the link including the history information; and transferring the generated link to another terminal such that the other terminal performs the transition using the history information.

At least one example embodiment provides that the method further includes storing history information about a transition between the first track and the second track in a metadata format; generating a link comprising the history information; and transmitting the link to another terminal such that the other terminal accesses the first track and the second track through the link and displays the first track and the second track according to the history information.

At least one example embodiment provides that the method further includes providing, in response to a termination in a play time of the first video, information indicating a termination in playing the first video; and determining whether to one of (i) re-play the first video from a start of the first video, (ii) play the second video, and (iii) play the first video from a desired play location of the first video.

At least one example embodiment provides that the method further includes seeking a desired video segment corresponding to a desired play location of a desired one of the plurality of videos in response to a request from the player for the desired play location; receiving the desired video segment and a plurality of video segments that follow the desired video segment; and sequentially transferring the received video segments to the player.

At least one example embodiment provides that each of the plurality of videos includes a track-by-track advertisement segment, and the method further includes providing a first track-by-track advertisement segment corresponding to the first video when at least one segment of the first video segments is played; and providing a second track-by-track advertisement segment corresponding to the second video when at least one segment of the second video segments is played.

At least one example embodiment provides that each of the plurality of videos corresponds to one of a plurality of thumbnails and a set of the plurality of thumbnails is displayed while one of the plurality of videos is played.

At least one example embodiment provides that the first video segments are received through a single data flow and the second video segments are received through the single data flow.

At least one example embodiment relates to a computer-readable medium storing program code, which when executed by a processor, configures the processor to perform functions according to example embodiments.

According to at least one example embodiment, a computer-readable medium stores program code, which when executed by a processor, configures the processor to receive a request for multi-track video, the multi-track video including a plurality of videos, each of the plurality of videos corresponding to a track, each of the plurality of videos being divided into time-based video segments; request a first video of the plurality of videos, the first video corresponding to a first track of the multi-track video; receive first video segments corresponding to the first video; sequentially transfer the first video segments to a player for displaying the sequentially transferred first video segments; receive second video segments of a second video of the plurality of videos instead of receiving the first video segments, the second video segments corresponding to a second track of the multi-track video; and sequentially transfer the second video segments to the player for displaying the sequentially transferred second video segments.

At least one example embodiment relates to a terminal for playing multi-track video content.

According to at least one example embodiment, a terminal for playing multi-track video content includes a processor. The processor includes a request receiver configured to receive a request for multi-track video content from a player, the multi-track video including a plurality of videos, each of the plurality of videos corresponding to a track, each of the plurality of videos being divided into time-based video segments; the processor includes a requester configured to request a first video of the plurality of videos based on the received request, the first video corresponding to a first track of the multi-track video; and the processor includes a video transferor configured to receive first video segments corresponding to the first video, sequentially transfer the first video segments to the player for displaying the sequentially transferred first video segments, receive second video segments of a second video of among the plurality of videos instead of receiving the first video segments, the second video segments corresponding to a second track of the multi-track video, and sequentially transfer the second video segments to the player for displaying the sequentially transferred second video segments.

At least one example embodiment provides that each of the plurality of videos includes a start point and an end point and each of the plurality of videos are synchronized according to a play order, and in response to a selection of the second track at the player, the sequentially transferred second video segments of the second track are continuously played at a start point of the second video, the continuously playing including transitioning from an end point of a currently played segment of the first video segments when the currently played segment is completed to the start point of the second video.

At least one example embodiment provides that history information about a transition between the first track and the second track is stored in a metadata format, and the processor includes a link transferor configured to generate a link for accessing at least the first track and the second track, the link including the history information; and transfer the generated link to a terminal such that the terminal performs the transition using the history information.

At least one example embodiment provides that the processor includes a history information repository configured to store, in a computer readable medium, history information about a transition between the first track and the second track in a metadata format. At least one example embodiment provides that the processor includes a link transmitter configured to generate a link comprising the history information, and transmit the link to a terminal such that the terminal accesses the first track and the second track through the link and displays the first track and the second track according to the history information.

At least one example embodiment provides that video transferor is further configured to provide, in response to a termination in a play time of the first video, information indicating a termination in playing the first video, and determine whether to one of (i) re-play the first video from a start of the first video, (ii) play the second video, and (iii) play the first video from a desired play location of the first video.

At least one example embodiment provides that the processor includes a segment seeker configured to seek a desired video segment corresponding to a desired location of a desired one of the plurality of videos in response to a request from the player for the desired location. At least one example embodiment provides that the video transferor is configured to receive the desired video segment and video segments followed by the desired video segment, and sequentially transfer the received video segments to the player.

At least one example embodiment provides that each of the plurality of videos includes a track-by-track advertisement segment, and the video transferor is further configured to transfer a first track-by-track advertisement segment corresponding to the first video when at least one segment of the first video segments is played; and transfer a second track-by-track advertisement segment corresponding to the second video when at least one segment of the second video segments is played.

At least one example embodiment provides that the first video segments are received through a single data flow and the second video segments are received through the single data flow.

At least one example embodiment relates to a file distribution system.

According to at least one example embodiment, a file distribution system includes a processor that includes an installation file manager configured to store and manage an installation file for installing an application, and an installation file transmitter configured to transmit the installation file to a terminal in response to a request of the terminal. The application configures the terminal to transmit a request for a multi-track video to a proxy server, the multi-track video including a plurality of videos and each of the plurality of videos being divided into time-based video segments and being stored in a content server; receive, from the proxy server, first video segments corresponding to a first video of the plurality of videos, the first video corresponding to a first track of the multi-track video; play the first video of the first track as the first video segments are received from the proxy server, the proxy server receiving the first video segments from the content server; request a second video of the plurality of videos in response to a user selection of the second video, the second video corresponding to a second track of the multi-track video; receive, from the proxy server, second video segments of the second video; and play the second video of the second track as the second video segments are received from the proxy server, the proxy server receiving the second video segments from the content server.

At least one example embodiments provides that each of the plurality of videos includes a start point and an end point, the video segments of each of the plurality of videos are synchronized according to a play order, and the application further configures the terminal to play the second video segments based on a start point of the second video and an end point of a segment of the first video segments, the playing including transitioning from the end point of the segment of the first video segments to the start point of the second video in response to a selection of the second track.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Figure 1:
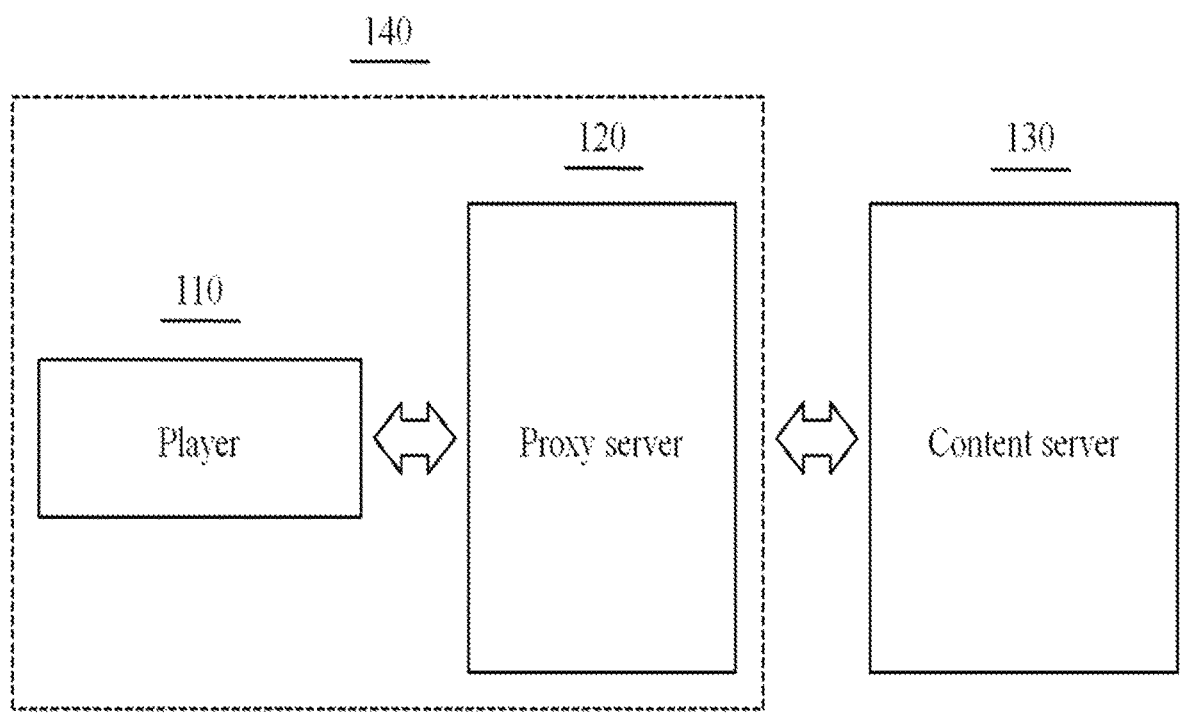
FIG. 1 illustrates an example of an environment for providing a multi-track video content service according to example embodiments.

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described in detail with reference to the accompanying drawings.

Example embodiments relate to a multi-track video content service method and system for providing a streaming service with respect to multi-track video content.

A multi-track video content service method and system according to example embodiments may seamlessly switch and play a number N of contents (hereinafter referred to as "N contents"), where each of the N contents includes an audio and video (A/V) stream. The systems and methods according to example embodiments may also switch to provide N contents using traffic flow, a data flow, and/or any other like sequence of data packets that is typically used to provide a single content item to a user terminal.

According to example embodiments, it is also possible to provide a multi-track video content service capable of performing free seeking within the N contents. Additionally, according to example embodiments, it is possible to provide refined content of a contents provider (CP) or to provide multi-track video content by grouping readymade content (RMC) for each or a plurality of themes. According to example embodiments, one or more RMC groupings may be selected by a user. Furthermore, example embodiments may be used to provide multi-track video content even with respect to user generated content (UGC). Moreover, according to example embodiments, it is possible to provide paid or free multi-track video content and to expose an advertisement for each multi-track video.

FIG. 1 illustrates an example of an environment for providing a multi-track video content service according to example embodiments. FIG. 1 illustrates a player 110, a proxy server 120, and a content server 130.

As shown in FIG. 1, during operation, the terminal 140 includes the player 110 and the proxy server 120. According to various embodiments, the terminal 140 may be hardware computing device capable of communicating with a server (e.g., the content server 130, etc.), such that the terminal 140 is able to receive services from the server. The services may include a video providing service, an advertisement providing service, and the like. The terminal 140 may include memory, one or more processors, and transceiver. The terminal 140 may be configured to send/receive data to/from network devices, such as a router, switch, or other like network devices, via a wired connection, a wireless connection (i.e., an air interface), and/or any other like tangible and intangible medium. The terminal 140 may be designed to sequentially and automatically carry out a sequence of arithmetic or logical operations; equipped to record/store digital data on a machine readable medium; and transmit and receive digital data via one or more network devices. The terminal 140 may include devices such as desktop computers, laptop computers, cellular phones and/or smartphones, tablet personal computers, wearable computing devices, and/or any other physical or logical device capable of recording, storing, and/or transferring digital data via a connection to a network device. The terminal 140 may include a transmitter/receiver (or transceiver) configured to operate in accordance with wireless communications standard.

The player 110 may be an application installed in the terminal 140 and may include a function of controlling the terminal 140 to receive multi-track video content and play the multi-track video content through a relatively seamless transition between tracks. The playing of the multi-track video may include displaying the multi-track video content using a display device associated with the terminal 140 (not shown).

The proxy server 120 may include a function of receiving multi-track video content from the content server 130 in response to a request of the player 110. The proxy server 120 may also provide the received multi-track video content to the player 110 through a streaming service. In some embodiments, the proxy server 120 may include a separate hardware system that communicates with the terminal 140 over a network via the proxy server module installed on the terminal 140 (not shown). As shown in FIG. 1, the proxy server 120 may operate as a software module together with the player 110. For example, the proxy server 120 in the form of the software module may be installed in a memory device of the terminal 140 through an installation file for installing the player 110. The software module may be loaded into one or more processors of the terminal 140, thereby transforming the one or more processors into a special purpose processor configured to perform the various operations according to example embodiments. In this case, one or more processors including the proxy server 120 may communicate with the player 110 within the terminal 140, may receive a request of the player 110, may receive video content corresponding to the request from the content server 130, and may provide the video content to the player 110 through a streaming service.

The content server 130 is a physical hardware device configured to store single multi-track video content, and to provide a file for the multi-track video content to the proxy server 120 in response to the request of the proxy server 120. According to various embodiments, the content server 130 may include one or more physical computer hardware systems that are configured to provide services for client devices (e.g., the terminal 140, etc.) connected to a communications network. The content server 130 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). The content server 130 may be configured to establish, manage, and terminate one or more communications sessions between one or more computing devices.

According to various embodiments, the content server 130 may be connected to one or more local and/or remote databases (not shown). In various embodiments, the one or more databases may include a database management system ("DBMS"), a relational database management system ("RDBMS") database, an object database ("ODBMS"), column-oriented DBMS, correlation database DBMS, and/or other like database management systems. In various embodiments, the one or more databases may be used by the content server 130 to store and record video content and/or advertising content in order to recall and provide the video content and/or advertising content to a client (i.e., terminal 104).

According to various embodiments, the terminal 140 and the content server 130 may communicate with each other via a communications network (not shown). The communications network may be any interconnected network of computing devices. The communications network may be configured to operate various communication networks such as a personal area network (PAN), a local area network (LAN), a metropolitan area network (MAN), or a wide area network (WAN). Further, the communications network may be the internet. In some embodiments, the communications network may use a wireless transmission technique which is used for a short range communication, such as infrared data association (IrDA) or a Bluetooth.

According to example embodiments, when the proxy server 120 is included in the terminal 140 in the form of the software module, the content server 130 may provide one or more files for the multi-track video content to the terminal 140 in response to a request of the terminal 140.

Here, the content server 130 may store a number N of videos (hereinafter referred to as "N videos") for the multi-track video content. In this case, each of the N videos may be divided into intervals of a desired (or alternatively "predetermined") unit of time, (e.g., one second, etc.). In various embodiments, each of the N videos may be divided into transport stream (TS) files each having a size of the unit of time (e.g., each TS file having a one second size) to be stored for quick track transition. According to various embodiments, a first frame of the TS files may be an "I-frame" and the remaining frames may be "P-frames" and/or "B-frames". Additionally, in embodiments where the H.264/MPEG-4 AVC compression standard is used, "I-slice", "P-slices", and/or "B-slices" may be used instead of an "I-frame", "P-frames", and/or "B-frames".

Figure 2:
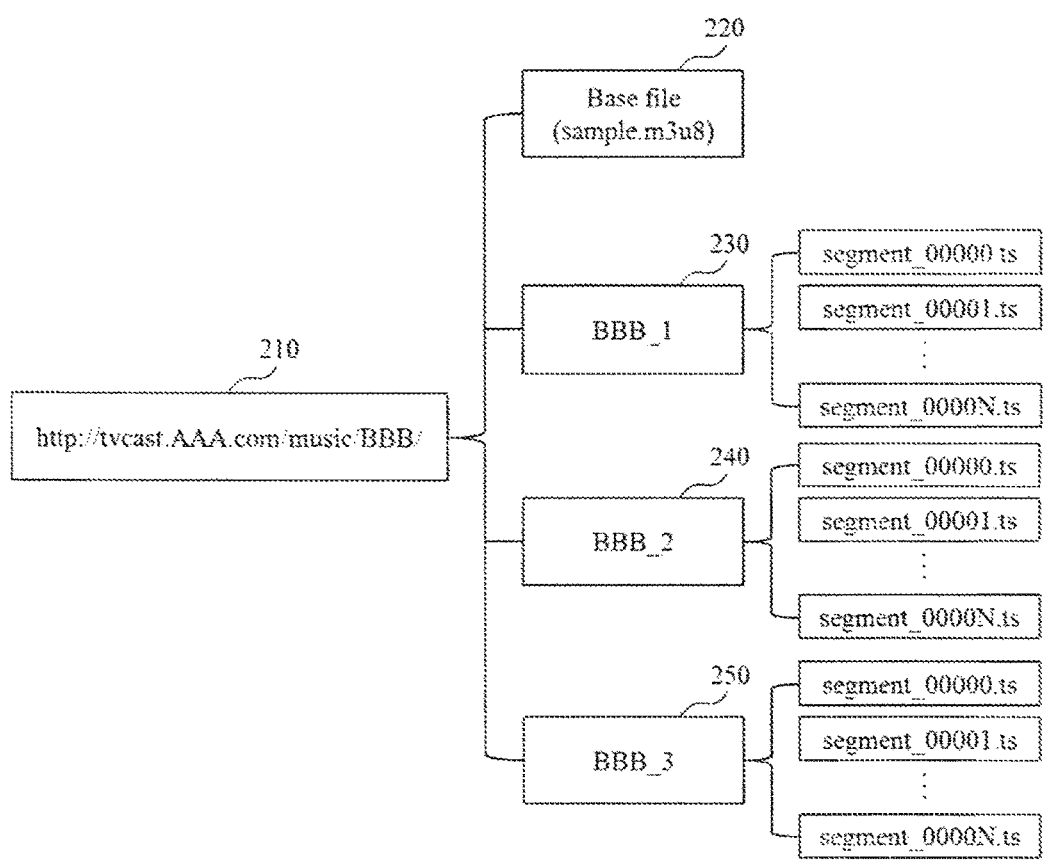
FIG. 2 illustrates an example of a repository configuration of multi-track video content according to example embodiments.

FIG. 2 illustrates an example of a repository configuration of multi-track video content according to example embodiments. Referring to FIG. 2, a root directory 210 includes a base file 220 and directories (e.g., BBB_1 230, BBB_2 240, and BBB_3 250) about a plurality of videos of multi-track video content "BBB". Each of the plurality of videos is divided into a number N of TS files (hereinafter referred to as "N TS files") and stored in a corresponding directory. The base file 20 may be a file having the file extension of, for example, "m3u9". Although FIG. 2 illustrates an example in which each of the plurality of videos is divided into the same number of N TS files, each of the plurality of videos may have a different size and/or play time, and thus, the plurality of videos may be divided into a different number of TS files than shown in FIG. 2.

Figure 3:
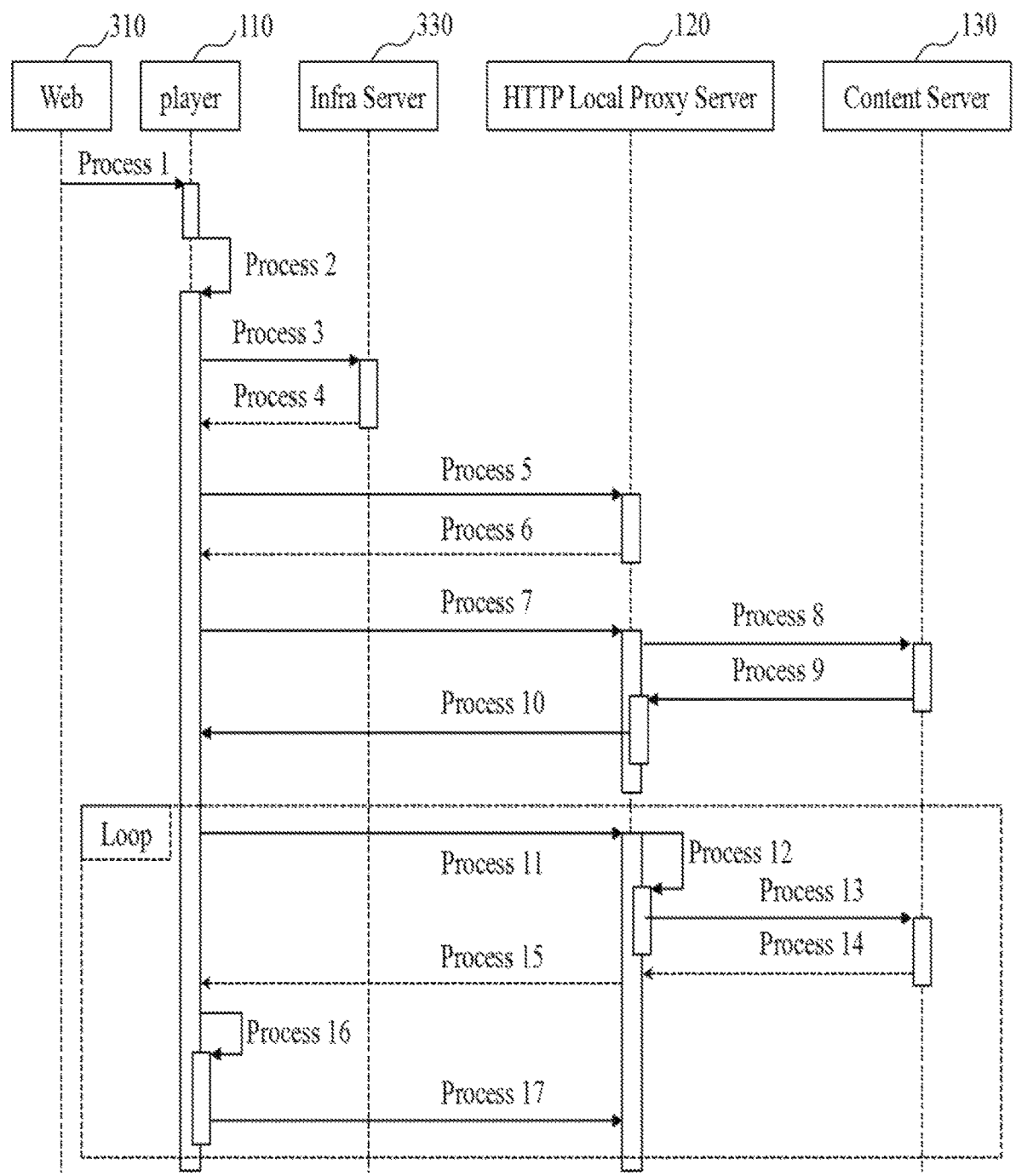
FIG. 3 illustrates an example of a play sequence according to example embodiments.

FIG. 3 illustrates an example of a play sequence according to example embodiments. FIG. 3 illustrates a play sequence among a web 310, player 110, an infra server 330, proxy server 120, and a content server 130. An example of playing multi-track video content on a webpage corresponding to the web 310 in interaction with an Android app corresponding to the player 110 will be described with reference to FIG. 3.

As shown by process 1, the web 310 executes the player 110 using an intent interaction method by sending intent information to the player 110. As shown by process 2, the player 110 analyzes the received intent information.

As shown by process 3, the player 110 requests metadata from the infra server 320. According to various example embodiments, the infra server 330 is a physical hardware device that manages the metadata and provides the metadata to the player 110. According to example embodiments, the infra server 330 may be a hardware device and/or one or more software modules included in the content server 130. In other embodiments, the infra server 330 may be an independent system of one or more physical hardware computing devices that are connected to the content server 130 via a wireless or wired connection. The infra server 330 may have a same or similar configuration as the content server 130 as discussed herein. In various embodiments, the player 110 may include access information and/or user authentication information that is used for accessing the infra server 330 to request the metadata as shown by process 3. In such embodiments, the infra server 330 may provide the metadata to the player 110 based on the access information and/or the user authentication information. As shown by process 4, the infra server 330 provides the metadata to the player 110. An example of the metadata may be expressed as the following Table 1.

TABLE 1

```
<result>
    <code>0</code>
    <message>OK</message>
    <multiTrackVideo id="14783275">
        <defaultTrackId>A90835C826AC3441B9F7928155487839090E</ defaultTrackId >
        <title>multi-track video test - BBB</title>
        <description> multi-track video test - BBB</description>
        <fileNameList type="url">http://tvcast.AAA.com/music/BBB/sample.m3u8</fileNameList>
        <trackList>
            <track>
                <id>A90835C826AC3441B9F7928155487839090E</id>
                <title>BBB_1</title>
                <playTime>280.00</playTime>
                <description> multi-track video test - BBB_1</description>
                <path> http://tvcast.AAA.com/music/BBB/BBB_1</path>
                <thumbnail>http://tvcast.AAA.com/music/BBB/image/BBB_1.png</thumbnail>
            </track>
            <track>
                <id>65C7B26E28D0B6CF4FA72780974B2E7A6B6B</id>
                <title>BBB_2</title>
                <playTime>280.00</playTime>
                <description> multi-track video test - BBB_2</description>
                <path> http://tvcast.AAA.com/music/BBB/BBB_2</path>
                <thumbnail>http://tvcast.AAA.com/music/BBB/image/BBB_2.png</thumbnail>
            </track>
            <track>
                <id>74C0FFC08A2F6A1752C0994D9E29BBA102C3</id>
                <title>BBB_3</title>
```

TABLE 1-continued

```
            <playTime>280.00</playTime>
            <description> multi-track video test - BBB_3</description>
            <path> http://tvcast.AAA.com/music/BBB/BBB_3</path>
            <thumbnail>http://tvcast.AAA.com/music/BBB/image/BBB_3.png</thumbnail>
        </track>
    </trackList>
  </multiTrackVideo>
</result>
```

As shown by process 5, the player 110 transfers data (e.g., a portion of the metadata) required for playing the content to the proxy server 120.

As shown by process 6, the proxy server 120 transfers, to the player 110, a local uniform resource identifier (URI) (e.g., "http://127.0.0.1:10001/play.m3u8") that is an address to access the video content.

As shown by process 7, the player 110 sends a request to the proxy server 120 for a base file. For example, the base file may be a file having the extension of 'm3u8' described above with reference to FIG. 2, for example, a file 'sample.m3u8' in Table 1.

As shown by process 8, the proxy server 120 sends a request to the content server 130 for the base file. For example, the proxy server 120 may send a request to the content server 130 for the base file 'sample.m3u8' through address http://tvcast.AAA.com/music/BBB/sample.m3u8, which has a value of <fileNameList> as shown in Table 1.

As shown by process 9, the contents server 130 responds to the request of the proxy server 120 by transmitting the requested file to the proxy server 120. For example, the content server 130 may transmit the base file 'sample.m3u8' to the proxy server 120.

As shown by process 10, the proxy server 120 responds to the request of the player 110 by sending the requested file to the player 110. For example, the proxy server 340 may transmit the base file 'sample.m3u8' to the player 110. An example of the file having the extension of 'm3u8' may be expressed as the following Table 2.

TABLE 2

```
#EXTM3U
#EXT-X-VERSION:3
#EXT-X-MEDIA-SEQUENCE:0
#EXT-X-ALLOWCACHE:1
#EXTINF:1.0,
SEGMENT_00000.ts
#EXTINF:1.0,
SEGMENT_00001.ts
#EXTINF:1.0,
SEGMENT_00002.ts
#EXTINF:1.0,
SEGMENT_00003.ts
#EXTINF:1.0
#EXT-X-TARGETDURATION:1
```

As shown by process 11, the player 110 sends a request to the proxy server 120 for TS files in an order in which the TS files are included in the file (e.g., the file having the extension of 'm3u8'). An example of a URI used for requesting the TS files may be expressed as the following Table 3.

TABLE 3

```
"http://127.0.0.1:10001/segment_00000.ts
"http://127.0.0.1:10001/segment_00001.ts
"http://127.0.0.1:10001/segment_00002.ts
```

As shown by process 12, the proxy server 120 adds a TS file name, for example, segment_00000.ts, segment_00001.ts, and segiment_00002.ts, of a TS file URI requested by the player 110 to a host, for example, BBB_1, of a currently selected track, and generates a URI for TS request. An example of the URI for the TS request may be expressed as the following Table 4.

TABLE 4

```
http://tvcast.AAA.com/music/BBB/BBB_1/segment_00000.ts
http://tvcast.AAA.com/music/BBB/BBB_1/segment_00001.ts
http://tvcast.AAA.com/music/BBB/BBB_1/segment_00002.ts
```

URIs of Table 4 may be information used to request TS files of the video "BBB_1" among a plurality of videos included in the multi-track video content 'BBB'.

As shown by process 13, the proxy server 120 sends a request to the content server 130 for a TS file.

As shown by process 14, the content server 130 responds to the request of the proxy server 120 by transmitting the requested file to the proxy server 120. For example, the content server 130 may transmit the requested TS files, for example, segiment_00000.ts, segiment_00001.ts, and segiment_00002.ts, to the proxy server 120.

As shown by process 15, the proxy server 120 responds to the request of the player 110 by transmitting the requested file to the player 110. For example, the proxy server 120 may transmit the requested TS files, for example, segiment_00000.ts, segiment_00001.ts, and segiment_00002.ts, to the player 110.

As shown by process 16, the player 110 plays a video using the transferred TS files. Here, the TS files may be streamed or otherwise sequentially transferred from the proxy server 120 to the player 110 for playback.

As shown by process 17, the player 110 sends a request to the proxy server 120 for a track transition. In various embodiments, processes 11 through 16 are repeatedly performed, and the player 110 may receive and play TS files of the transited track.

According to various example embodiments, thumbnails, icons, and/or other like images about other tracks may be provided to the user to enable to user to select and play other tracks through the player 110. The thumbnails may be provided by using an address included in the <thumbnail> tag as shown by Table 1. In such embodiments, a user may select a single thumbnail from among a plurality of displayed thumbnails exposed through the player 110 in process 17, and player 110 may transition from a currently playing track to a selected track (i.e., a track corresponding to the selected thumbnail). For example, in embodiments where the terminal 140 is a smartphone including a touchscreen display device, the user may select the thumbnail by touching the thumbnail. In embodiments where the terminal 140 is a desktop computer or a laptop computer, the user may select the thumbnail through a touch pad or by a mouse click.

The player 110 and/or the proxy server 120 may include a buffer configured to store data for a previous and/or a subsequent track. According to various embodiments, in response to a track transition at the player 110 during playback, the proxy server 120 may transmit data about the transited track to the player 110. In this case, data (e.g., a TS file) for a subsequent track may be stored in the buffer of the player 110.

Figure 4:
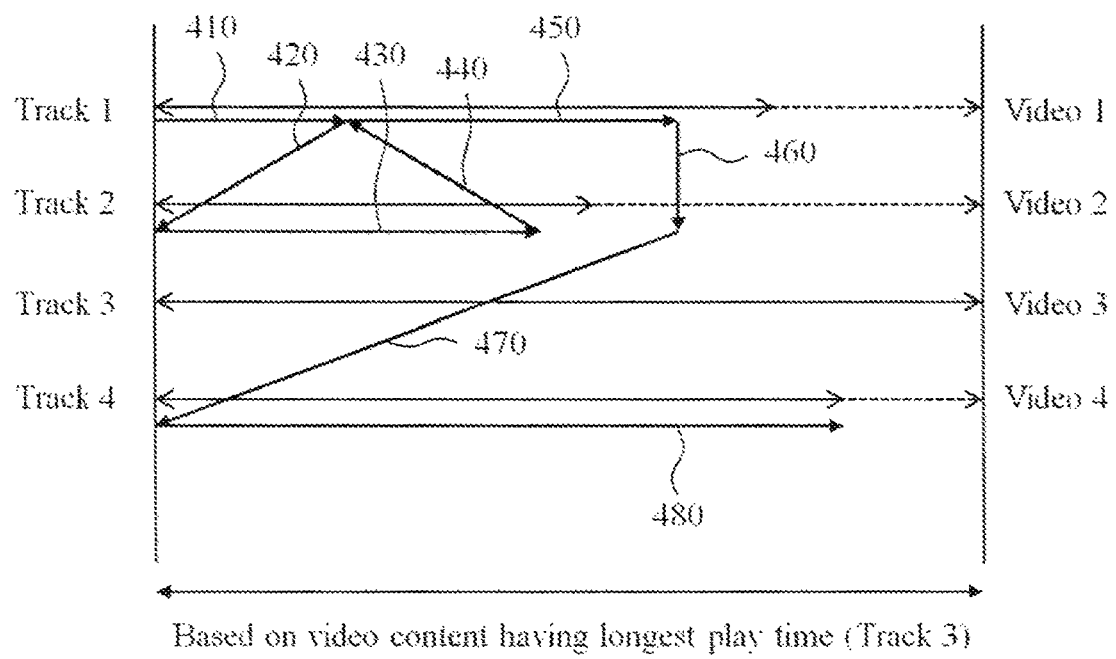
FIG. 4 illustrates an example of a process of playing multi-track video content according to example embodiments.

FIG. 4 illustrates an example of a process of playing multi-track video content according to example embodiments. FIG. 4 illustrates an example of a process of playing multi-track video content including four tracks. Here, in each of the tracks, a bi-directional solid arrow indicator may indicate a play time of a corresponding track. Referring to FIG. 4, it can be known that videos played in the four tracks, respectively, have different play times.

A first arrow indicator 410 indicates that video 1 of 'track 1' is played during a period of time substantially corresponding to a length of the first arrow 410.

A second arrow indicator 420 indicates that a transition from 'track 1' to 'track 2' is made. Here, video 2 may be played from the start.

A third arrow indicator 430 indicates that video 2 of 'track 2' is played during a period of time substantially corresponding to a length of the third arrow indicator 430.

A fourth arrow indicator 440 indicates that a transition from 'track 2' back to 'track 1' is made. Here, video 1 of 'track 1' may resume from a point at which the track 1 transitioned to track 2, which is hereinafter referred to as a "last play time". For example, the proxy server 120 may manage information about a last play time for each track. As an example, it is assumed that video 1 of 'track 1' is divided into files from "segment.00001.ts" to "segment.00100.ts", and files up to "segment.00030.ts" are played at the player 110 during a period of time substantially corresponding to the length of the first arrow indicator 410. Here, when a user makes a transition from 'track 2' to 'track 1', the proxy server 340 may transmit the file "segment.00031.ts" to the player 110 to play a subsequent file of a file last played in video 1.

A fifth arrow indicator 450 indicates that video 1 of 'track 1' is played during a period of time substantially corresponding to the length of the fifth arrow indicator 450.

A sixth arrow indicator 460 indicates that another transition from 'track 1' to 'track 2' is made. As shown in FIG. 4, the playback of video 2 has ended. Here, when a transition and/or movement to 'video 2' having a terminated and/or expired play time is made, the player 110 may expose information indicating that a play of a video of a current track (e.g., video 2) is completed. In various embodiments, information indicating that the video of the current track has completed may include a "sign-off screen". In this case, the player 110 may provide the user with a user interface for determining whether to (i) view a video of a corresponding track (e.g., video 2) from a beginning of video 2, (ii) move to another track, or (iii) seek a desired play location of the video of the corresponding track (e.g., video 2).

According to various embodiments, even when all the videos of a current track are played, a user interface that is the same or similar to the aforementioned user interface may be provided to the user.

Referring back to FIG. 4, a seventh arrow indicator 470 indicates that a transition from 'track 2' to 'track 4' is made. As described above, a video to be initially played (e.g., video 4) may be played from the start.

An eighth arrow indicator 480 indicates that video 4 of 'track 4' is played during a period of time substantially corresponding to a length of the eighth arrow indicator 480.

Here, the player 110 may store information about a grouping list associated with a user, such as a list of videos included in the multi-track video content or a history about a transition between tracks. The player 110 may share the stored information with one or more other users using a social network service (SNS), a peer-to-peer (p2p) network, and/or any other like network of interconnected computing devices. Information about the grouping list or the history about the transition between tracks may be shared by sharing a URI and/or webpage link. In various embodiments, the link may be shared via a short message service (SMS), a multimedia message service (MMS), and/or any other like messaging service that allows user terminals to send and receive text messages. For example, the grouping list or the history about the transition between tracks may be shared by (i) generating data in metadata form in which an identifier of the grouping list and the history about the transition are stored in association with a link to the data, (ii) uploading the generated link to an SNS, p2p, or other like network, and/or (iii) transferring the link to another user through a SMS message, a MMS, and/or any other like messaging service. When the other user clicks on the link through a terminal of the other user, video data of the multi-track video content may be provided to the other user in an order in which the user has performed a track transition.

As described above, various example embodiments allow a user terminal to switch between playbacks of N contents that each have an A/V stream. Various example embodiments also allow a user terminal to switch between the N contents via a single data flow that is used to provide a single content item. Various example embodiments also provide a multi-track video content service capable of seeking within each of the N contents because the plurality of videos included in the multi-track video content are divided based on a desired unit of time and streamed to the user terminal based on the desired unit of time. By way of example, if a first video of a first track is divided into files from "segment.00001.ts" to "segment.00100.ts", and a second video of a second track is divided into files from "segment.00001.ts" to "segment.00100.ts", and the desired time unit is one second. When a transition to the second track is made after files up to "segment.00030.ts" of the first video is played, the player 110 may switch and play contents by receiving and playing "segment.00001.ts" of the second video. The player 110 may perform seeking in an individual video by receiving and playing a desired TS file of the second video. Furthermore, because only TS files of a switched video are received by the player 110, to the player 110 may switch and provide N contents with a single data flow used to provide single content.

Various example embodiments provide that refined content of a content provider (CP) may be provided to a user terminal and/or multi-track video content may be provided to a user terminal by grouping readymade content (RMC) for each or a plurality of themes. In various embodiments, a RMC may be selected by a user, or multi-track video content may be provided to a user terminal even with respect to user generated contents (UGC).

In various example embodiments, the user terminal may be provided with paid multi-track video content and/or free multi-track video content. In such embodiments, the paid multi-track video content may be multi-track video content provided to a user terminal associated with a subscription-based CP service. The free multi-track video content may be multi-track video content provided to a user terminal free of charge, where the multi-track video content includes at least one advertisement content item within one or more tracks.

Figure 5:
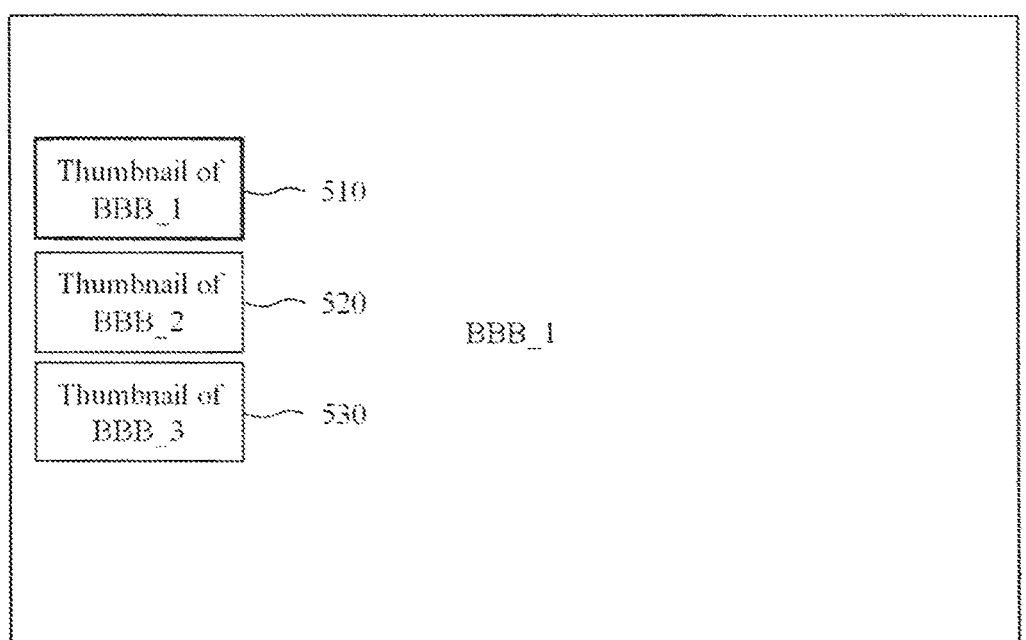
FIGS. 5 through 7 illustrate examples of a screen on which multi-track video content is serviced according to example embodiments.
Figure 6:
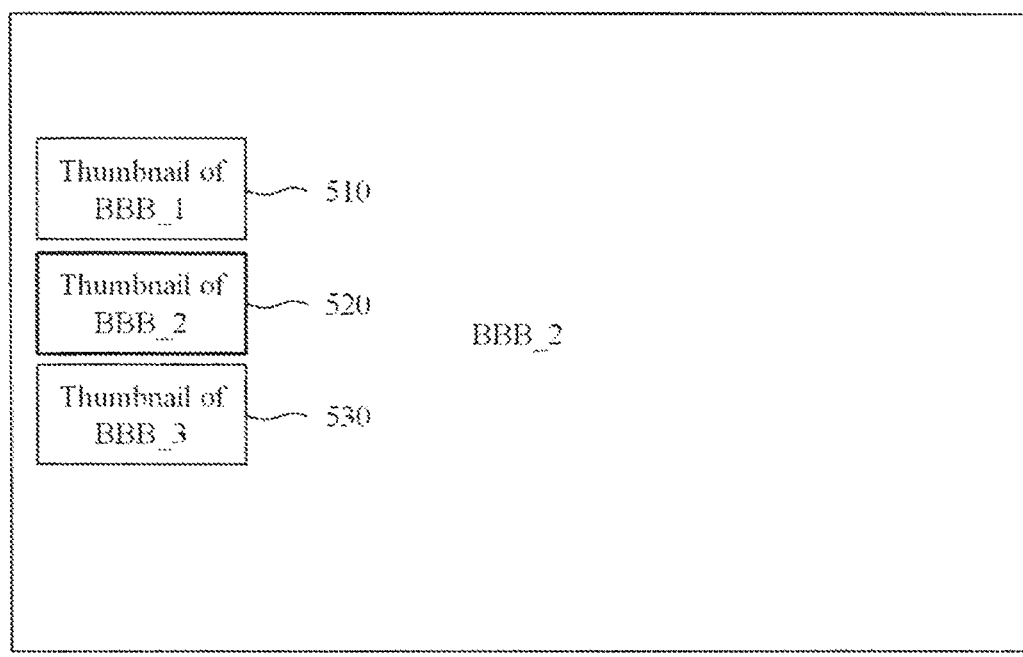
Figure 7:
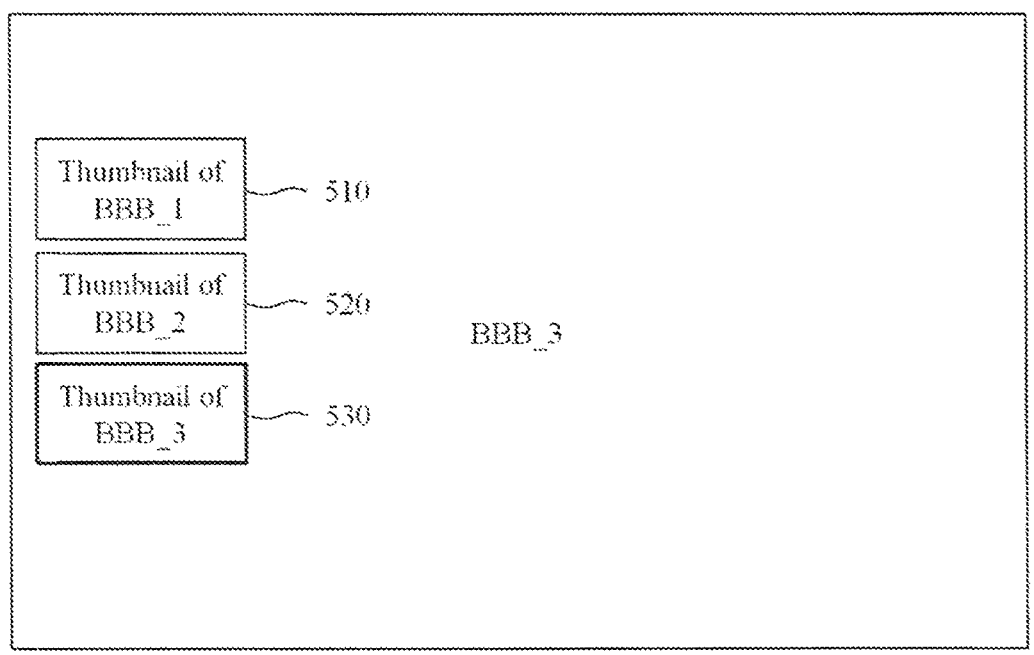

FIGS. 5 through 7 illustrate examples of a screen on which multi-track video content is serviced according to example embodiments. A first screen 500 of FIG. 5 shows an example of a screen on which video 'BBB_1' is played in a central portion of a display region on the terminal 140. Here, thumbnails 510, 520, and 530 of videos 'BBB_1', 'BBB_2', and 'BBB_3', respectively, included in the multi-track video content are displayed in a left portion of the first screen 500. Referring to FIG. 6, a second screen 600 shows an example of a screen on which a user selects the thumbnail 520, which corresponds to the video 'BBB_2', on the first screen 500. In response to the selection of thumbnail 520, a track transition is made and the video 'BBB_2' is played in the central portion of the display region of terminal 140. Referring to FIG. 7, a third screen 700 shows an example of a screen on which the user selects the thumbnail 530, which corresponds to the video 'BBB_3', on the second screen 600. In response to the selection of thumbnail 530, a track transition is made and the video 'BBB_3' is played in the central portion of the display region of terminal 140.

By way of example, the multi-track video content displayed in screens 500, 600, and 700 may be a music video of a musical group "BBB" including three singers. In this example, the video 'BBB_1' may be a video about a first member of the musical group "BBB", the video 'BBB_2' may be a video about a second member of the musical group "BBB", and the video 'BBB_3' may be a video about a third member of the musical group "BBB". In this example, the user may be selectively provided with a variety of images while music, for example, an audio of the music video is being played by the terminal 140.

By way of another example, referring to FIGS. 5 through 7, if the 'BBB_1' video is played by the terminal 140, and a user of terminal 140 selects the thumbnail 520, which corresponds to the video 'BBB_2', before the video "BBB_1" has completed or otherwise terminated, an advertisement video may be played prior to playing the "BBB_2" video. By way of another example, if the 'BBB_1' video is one minute long, and the user of terminal 140 selects the thumbnail 520, which corresponds to the video 'BBB_2, after the video "BBB_1" has played for thirty seconds, the 'BBB_1' video may be recalled and/or resumed at the thirty-second point when the user selects the thumbnail 510 while the video "BBB_2" is being played back. In some embodiments, when the user selects one of the thumbnails 510-530, the corresponding video may be restarted regardless of whether the user previously played the selected video.

Example embodiments illustrated by FIGS. 5 through 7 are only one example of providing a user interface for a track transition using a thumbnail. It should be noted that those skilled in the art will understand that the user interface may be variously configured and a method for providing information about a plurality of videos to a user may be variously configured.

Figure 8:
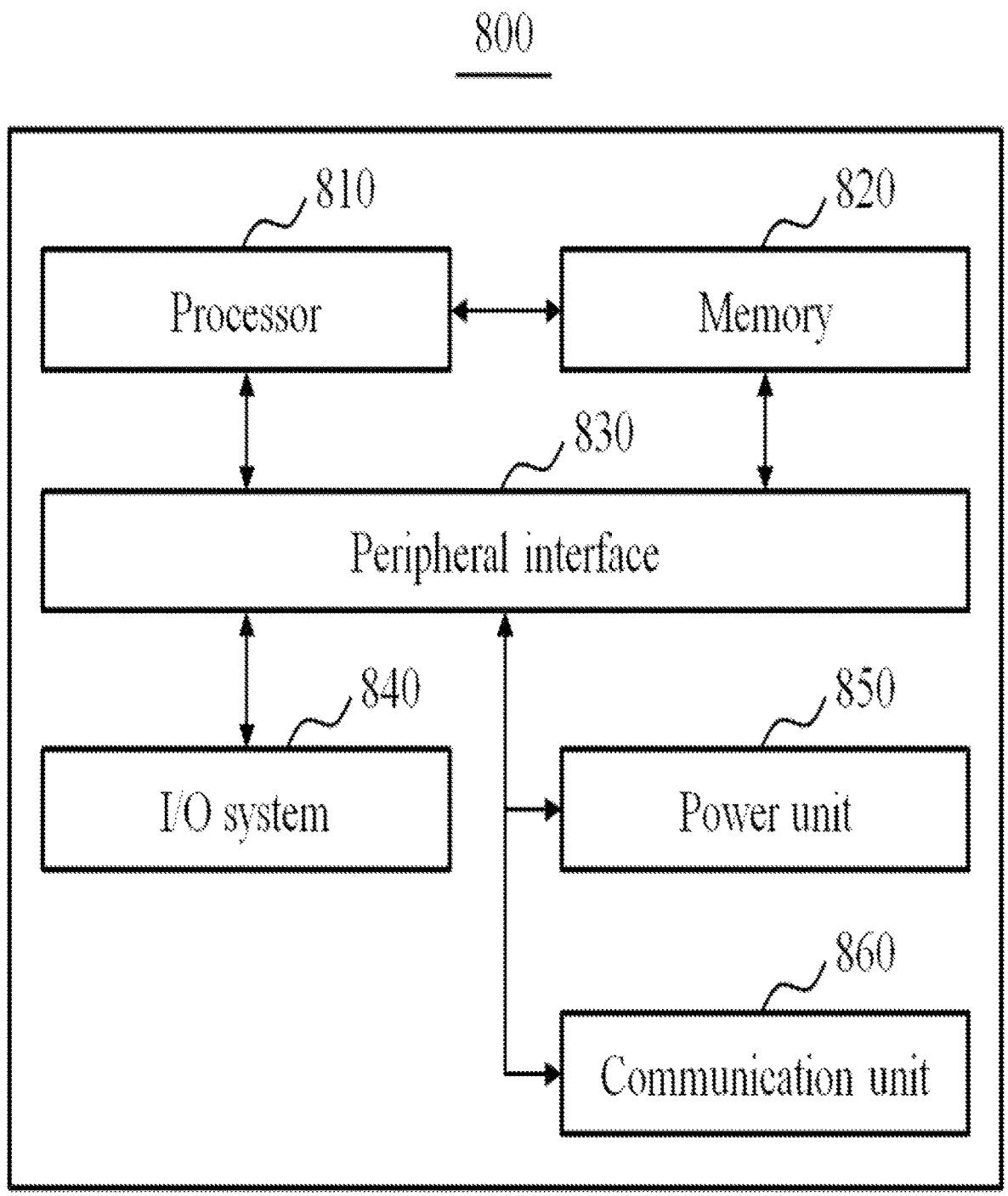
FIG. 8 illustrates an internal configuration of a terminal according to example embodiments.

FIG. 8 illustrates an internal configuration of a terminal 140 according to example embodiments. The terminal 140 may include processor 810, memory 820, a peripheral interface 830, an input/output (I/O) system 840, a power unit 850, and a communicator 860.

It should be noted that the terminal 140 may include many more components than those shown in FIG. 8. However, it is not necessary that all of these additional conventional components be shown in order to understand the example embodiments. For example, the terminal 140 may be a mobile terminal including a touch screen or a sensor in addition to components of FIG. 8. By way of another example, the communicator 860 may include a circuit for radio frequency (RF) communication within the communicator 860. Furthermore, the components included in the terminal 140 may be configured as hardware including specialized integrated circuit(s) for signal processing and/or specialized for executing software modules.

The memory 820 is a hardware device configured to store program code for one or more operating systems and/or program code for performing operations according to example embodiments. The program code may include software modules, firmware, middleware, microcode, hardware description languages, and/or any other like set of instructions. The memory 820 may include, for example, high-speed random access memory (RAM), a magnetic disk, static RAM (SRAM), dynamic RAM (DRAM), read only memory (ROM), flash memory, or non-volatile memory. Access to the memory 820 from another component, such as the processor 810 or the peripheral interface 830, may be controlled by the processor 810.

The peripheral interface 830 may couple an input and/or output of the terminal 140 with the processor 810 and the memory 820. The processor 810 may perform a variety of functions for the terminal 140 and may process data by executing the software module or the command set stored in the memory 820. In order to perform the variety of functions and data processing operations, the program code is loaded into the processor 810. Once the program code is loaded into the processor 810, the processor 810 may be programmed to perform the various operations and functions delineated by the program code, thereby transforming the processor 810 into a special purpose processor.

In various embodiments, the program code may also be loaded into the processor 810 and/or the memory 820 from a separate computer readable storage medium using a drive mechanism (not shown). Such separate computer readable storage medium may include a magnetic disc, DVD/CD-ROM/Blu-ray drive, memory card, USB flash drive, memory stick, and/or other like computer readable storage medium (not shown). In some embodiments, software components may be loaded into the processor 810 and/or the memory 820 from a wired or wireless network via a network interface and/or communicator 860, rather than via a computer readable storage medium.

The I/O system 840 is a hardware device that provides an interface between peripheral devices and the processor 810. The I/O system 840 may couple a variety of I/O peripheral devices with the peripheral interface 830. For example, the I/O system 840 may include a controller configured to couple a display device, a keyboard, a mouse, a printer, or a peripheral device such as a touch screen or a sensor, with the peripheral interface 830. In various embodiments, I/O peripheral devices may be coupled with the peripheral interface 830 without using the I/O system 840.

The power unit 850 may supply power to all of or a portion of the components of a terminal. For example, the power unit 850 may include a power management system, at least one power source such as a battery or alternating current (AC), a charging system, a power failure detection circuit, a power converter or inverter, a power state indicator, or predetermined other components for producing, managing, and distributing power.

The communicator 860 is a hardware device that enables communication between terminal 140 and another computer system using at least one external port. Alternatively, as described above, in various embodiments the communicator 860 enables communication with the other communication system by transmitting and/or receiving a RF signal or other like electromagnetic signal via a RF circuit.

The communicator 860 may communicate with the other computer systems via a cellular phone network, a wireless network such as a WLAN and/or metropolitan area network (MAN), an Internet network such as an intranet and/or World Wide Web (WWW). The wireless communication may include Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other like communication protocols. The wireless communication may employ a plurality of communication standards, protocols, and technologies, without being limited to the above examples.

In various embodiments, the communicator 860 may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols).

Figure 9:
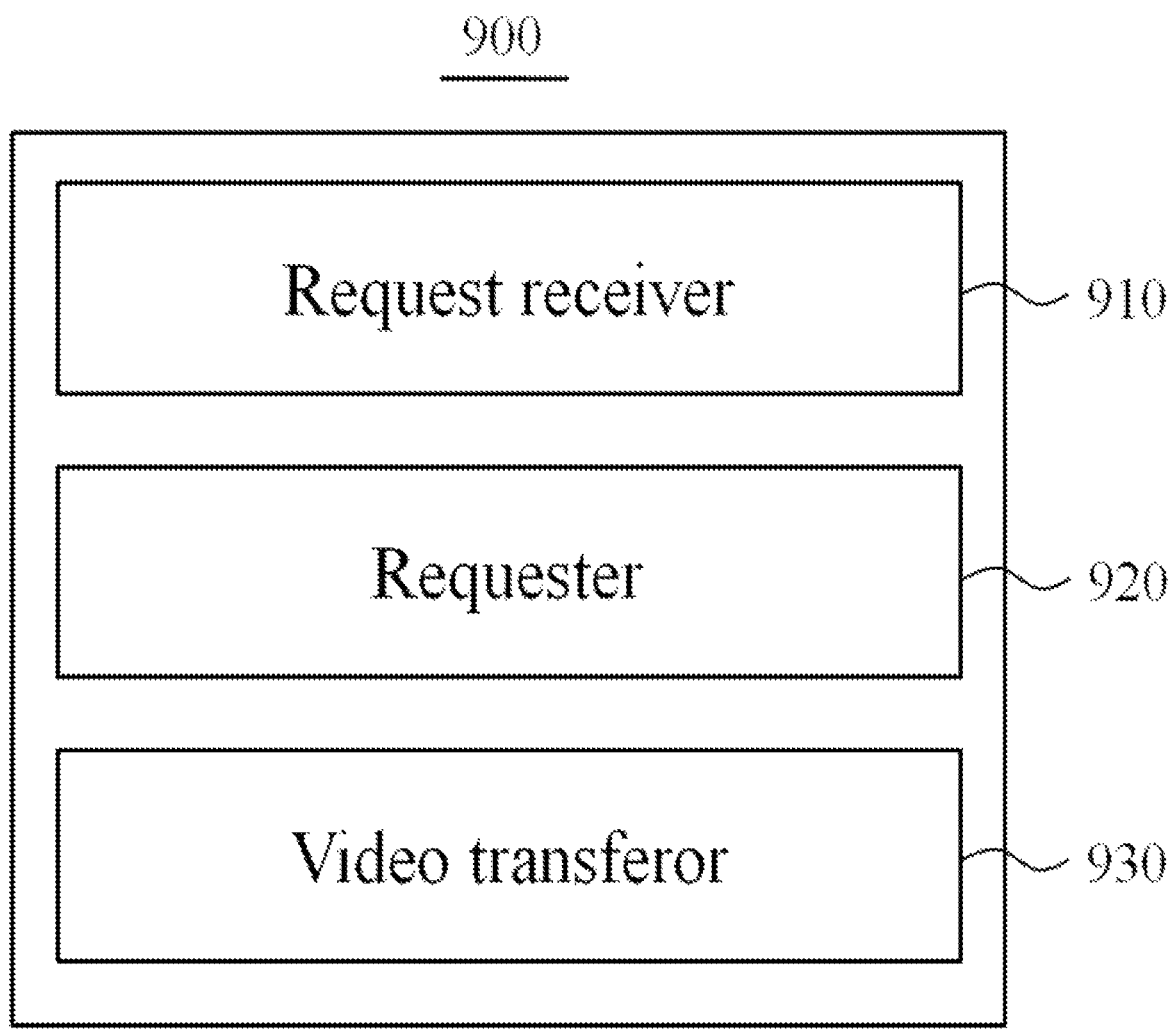
FIG. 9 illustrates a configuration of a processor of the terminal according to example embodiments.

FIG. 9 illustrates a configuration of the processor 810 when loaded with a software module representing the proxy server 120 according to example embodiments. During operation, the processor 810 includes a request receiver 910, a requestor 920, and a video transferor 930. As discussed above, in various embodiments, the proxy server 120 may operate as a software module together with the player 110. As shown in FIG. 9, the software module is loaded into the processor 810, thereby transforming processor 810 into a special purpose processor configured to perform the various operations according to example embodiments, such as the multi-track video content service methods discussed below with regard to FIG. 10.

Figure 10:
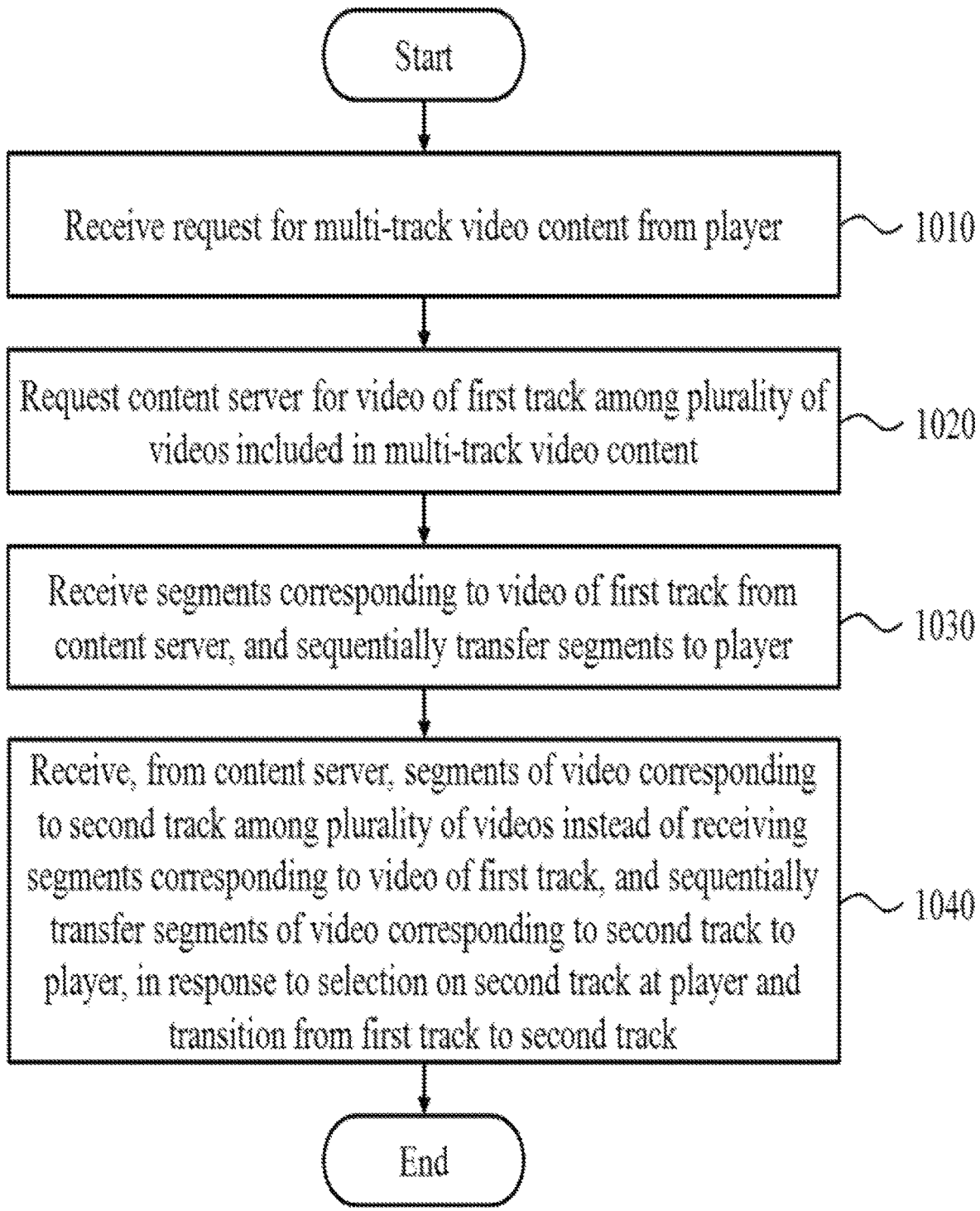
FIG. 10 is a flowchart illustrating a multi-track video content service method according to example embodiments.

FIG. 10 is a flowchart illustrating a multi-track video content service method according to example embodiments. For illustrative purposes, the multi-track video content service method is described as being performed by the processor 810 when loaded with a software module representing the proxy server 120. However, it should be noted that any hardware computing device that has a same or similar configuration as terminal 140 may also perform the multi-track video content service method.

In operation 1010, the request receiver 910 receives a request for multi-track video content from player 110. For example, a user may access a webpage through terminal 140, and may access multi-track video content of the webpage. Here, the player 110 is executed at the terminal of the user according to a control code of the webpage, and the player 110 may transmit the request for the multi-track video content to the proxy server 120.

In operation 1020, the requester 920 sends a request to content server 130 for a video of a first track among a plurality of videos included in the multi-track video content. Here, each of the plurality of videos may be divided into segments based on a desired time unit and may be stored in the content server 130 and/or one or more databases associated with the content server 130. An example in which each of the plurality of videos is divided into TS files based on a desired time unit and is stored in the contents server is described above.

In operation 1030, the video transferor 930 receives segments corresponding to the video of the first track from the content server 130, and sequentially transfers the received segments to the player 110. A transfer order of the received segments may correspond to a play order of the video of the first track.

In operation 1040, the video transferor 930 receives, from the content server 130, segments of a video corresponding to a second track among the plurality of videos. In various embodiments, the video transferor 930 may receive the segments of the video corresponding to the second track instead of receiving the segments corresponding to the video of the first track, and may sequentially transfer the segments of the video of the second track to the player 110. In various embodiments, the video transferor 930 may sequentially transfer the segments of the video of the second track to the player 110 in response to a selection of the second track by a user of the terminal 140 and a transition from the first track to the second track according to the selection. Accordingly, the player 110 may play the multi-track video content while performing a relatively seamless transition between multiple tracks by sequentially receiving and playing the segments of the video corresponding to the second track.

Here, a start point and an end point may be synchronized in the segments divided from each of the plurality of videos. For example, in response to a selection on a second track at the player and a transition from a first track to the second track, the player may complete playing of a segment of the first track being currently played and then play a segment of the second track based on a synchronized start point and end point, thereby enabling a relatively seamless playback between tracks, instead of immediately playing a segment of the second track.

According to example embodiments, in the player 110, history information about a transition between the first track and the second track may be stored in a metadata format for playing a video, and a link including the history information may be generated by the proxy server 120. The history information may be provided to another user via the generated link by transferring the generated link through a SNS, p2p, an SMS, or an MMS service.

According to example embodiments, although not illustrated, the multi-track video content service method of FIG. 10 may further include storing history information about a transition between the first track and the second track in a metadata format for playing a video; and generating and transmitting a link including the history information, in addition to operations 1010 through 1040 of FIG. 10. The storing of the history information may be performed by a history information repository (not shown) that may be further included in the proxy server 120 as discussed above with regard to FIGS. 1, 3 and 8-9. In various embodiments, the generating and the transmitting of the link may be performed by a link transmitter (not shown) that may be further included in the proxy server 120.

As discussed above, the history information may be stored in a metadata form, which may not require separate encoding devices or protocols and/or separate storage devices and/or storage protocols. For example, the process 3 discussed above with regard to FIG. 3, in which the player 110 requests the infra server 330 for metadata, and process 4, in which the infra server 330 provides the metadata to the player 110, may transfer the history information without requiring additional and/or separate encoding devices and/or encoding protocols or separate storage devices and/or storage protocols.

Here, the multi-track video content may be played at the terminal of the other user based on history information about the transition between the first track and the second track through the link provided to the other user. For example, the link generated by the proxy server 120 or the player 110 may be provided to another user through a variety of methods such as an SNS, p2p, an SMS, and/or an MMS. The terminal of the other user may receive history information stored in the metadata format through the link, and may play the multi-track video content while sequentially performing a transition between tracks based on history information. Even during a process of playing the multi-track video content based on the history information, a video of a track desired by the other user may be played in response to a track transition request of the other user. In this case, a player that is the same or similar to player 110 may be installed in the terminal of the other user.

According to example embodiments, although not illustrated, the multi-track video content service method of FIG. 10 may further include receiving segments followed by a last segment transmitted to the player among the segments corresponding to the video of the first track in response to a reselection on the first track at the player, and transferring the received segments to the player, in addition to operations 1010 through 1040. The receiving and transferring of the segments may be performed by the video transferor 930.

According to example embodiments, at least two videos among the plurality of videos may have different total play times. For example, a first plurality of videos included in a single multi-track video content may have the same total play time, and a second plurality of videos included in the single multi-track video may have different total play times. Here, in response to a termination in a play time of a video of a transited track, information indicating a termination of playing the video may be exposed or otherwise displayed by the player 110. For example, referring to FIG. 4, when a movement to video 2 of which a play time is over as indicated by the sixth arrow indicator 460, the player 110 may expose information indicating that a play of a video of a current track (e.g., video 2) is completed, such as a "sign-off screen". In this case, the player 110 may provide the user with a user interface for determining whether to re-play the video of the transited track from the start, whether to move to another track, and/or whether to seek a desired play location of the transited track.

According to example embodiments, although not illustrated, the multi-track video content service method of FIG. 10 may further include seeking a video segment corresponding to a desired location of a desired video in response to a request from the player 110 for the desired location of the desired video among the plurality of videos; receiving the desired video segment, and video segments followed by the desired video segment, from the content server 130; and sequentially transferring the received video segments to the player 110. The seeking of the video segments may be performed by a video segment seeker (not shown) that may be further included in the proxy server 120, where the receiving and the sequentially transferring of the video segments may be performed by the video transferor 930.

According to example embodiments, in each of the plurality of videos, a track-by-track advertisement may correspond to a video or a video segment. In this case, a track-by-track advertisement corresponding to a video or a video segment of a track being currently played at the player 110 may be exposed through the player 110. For example, an advertising effect may be increased by determining different advertisements to be suitable for a video of a corresponding track. Determining suitable advertisements for a corresponding track may be based on user demographics.

Figure 11:
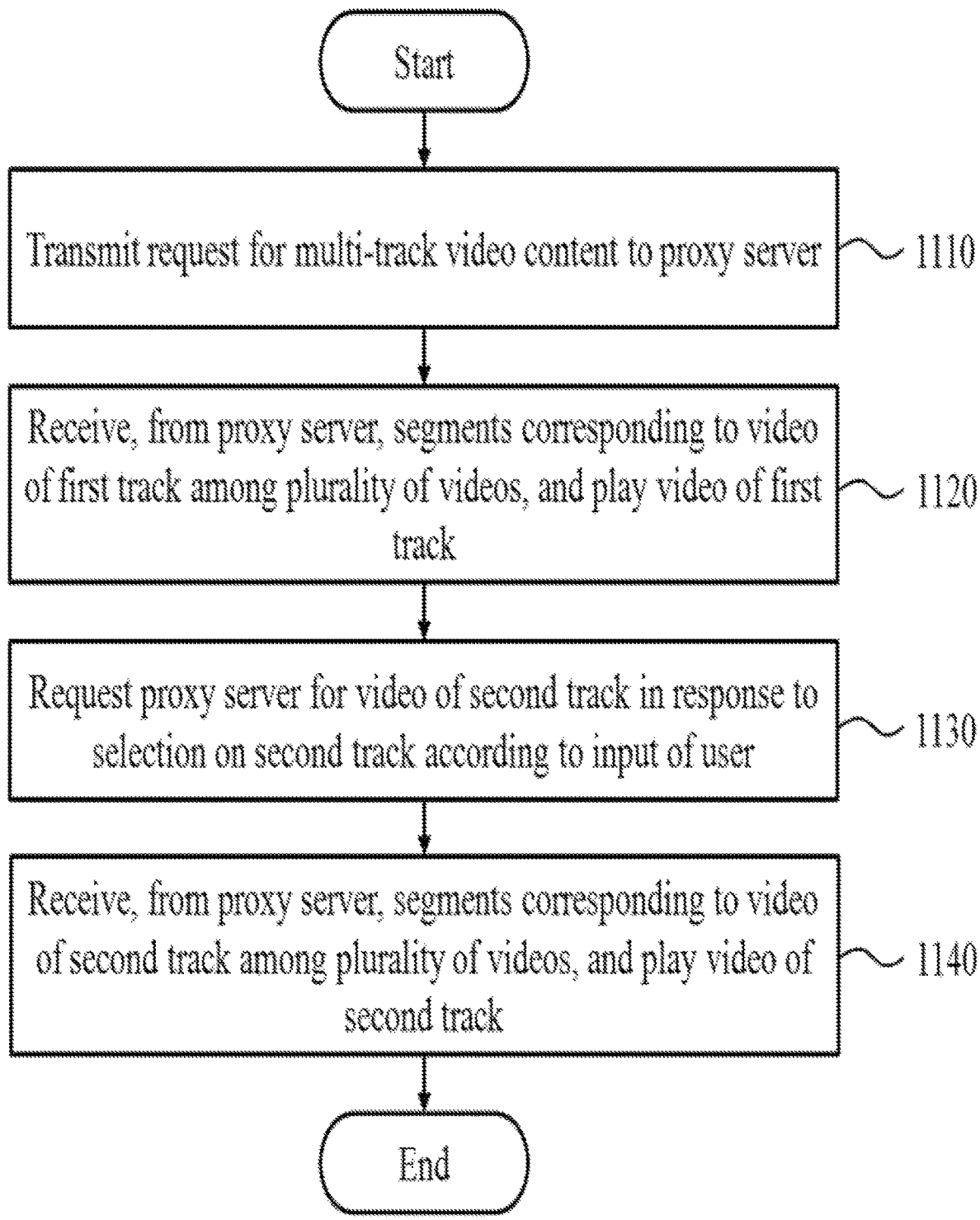
FIG. 11 is a flowchart illustrating a multi-track video content service method according to other example embodiments.

FIG. 11 is a flowchart illustrating a multi-track video content service method according to other example embodiments. The multi-track video content service method of FIG. 11 may be performed at the terminal 140 according to a control of a player 110. According to various embodiments, the player 110 may be installed in the terminal 140 by an installation file provided from a file distribution system (not shown). Here, the player 110 may include functions for controlling the terminal 140 to perform operations included in the multi-track video content service method. Also, the file distribution system may include (i) an installation file manager (not shown) configured to store and manage an installation file for installing an application and (ii) an installation file transmitter (not shown) configured to transmit the installation file to the terminal 140 in response to a request from the terminal 140 of the user.

In operation 1110, the terminal 140 may transmit a request for multi-track video content to the proxy server 120. As described above, the multi-track video content may include a plurality of videos. Each of the plurality of videos may be divided into video segments based on a desired time unit and may be stored in content server 130.

In operation 1120, the terminal 140 may receive, via the proxy server 120, segments corresponding to a video of a first track among the plurality of videos, and may play the video of the first track. Here, the proxy server 120 may receive the video segments corresponding to the video of the first track from the content server 130, and may transfer the segments to the player. In operation 1120, the terminal 140 may play the video of the first track using the video segments transferred from the proxy server.

In operation 1130, the terminal 140 may send a request to the proxy server 120 for a video of a second track in response to a selection on the second track according to a user input. In some embodiments, at operation 1130, the terminal 140 may send a request to the proxy server 120 for a video of a second track in response to a termination of the video of the first track.

In operation 1140, the terminal 140 may receive, via the proxy server 120, video segments corresponding to the video of the second track among the plurality of videos, and may play the video of the second track. Here, the proxy server 120 may receive the video segments corresponding to the video of the second track from the content server 130, and may transfer the received video segments to the player 110. In operation 1140, the terminal 140 may play the video of the second track using the segments transferred from the proxy server 120.

According to example embodiments, although not illustrated, the multi-track video content service method of FIG. 11 may further include receiving, from the proxy server 120, video segments followed by a last video segment played in operation 1120 from among the video segments corresponding to the video of the first track in response to a reselection of the first track according to a user input, the multi-track video content service method of FIG. 11 may further include playing the received video segments.

Here, a start point and an end point may be synchronized in segments divided from each of the plurality of videos. For example, in response to a selection of a second track at the player 110 and a transition from a first track to the second track, the player 110 may complete playing of a segment of the first track being currently played and then continuously play a segment of the second track based on a synchronized start point and end point. For example, the terminal 140 may play multi-track video content while seamlessly performing a transition between multiple tracks by completing playing of videos of each track based on a segment unit and then performing a track transition through the player 110.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The program code may be any set of software instructions that configure one or more processing devices to operate as according to the example embodiments. The program code and/or software modules may be embodied permanently or temporarily in any type of machine, component, physical or virtual equipment, computer storage medium or device, or in a propagated signal wave capable of providing instructions or data to or being interpreted by the processing device. The program code and/or software modules may also be distributed over network coupled computer systems so that the software is stored and executed in a distributed fashion. In particular, the program code and/or software modules may be stored by one or more computer readable recording media. The hardware devices include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

The hardware devices may also include one or more storage devices. The one or more storage devices may be computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing example embodiments as described above. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A multi-track video content service method performed by a first terminal, the method comprising:
receiving, by the first terminal, a user request for multi-track video, the multi-track video including a plurality of videos, each of the plurality of videos corresponding to a track, each of the plurality of videos being divided into time-based video segments;
requesting, by the first terminal, a first video of the plurality of videos, the first video corresponding to a first track of the multi-track video;
receiving, by the first terminal, first video segments corresponding to the first video;
sequentially transferring, by the first terminal, the first video segments to a player for displaying the sequentially transferred first video segments;
receiving, by the first terminal, a user input requesting a second video of the plurality of videos;
requesting, by the first terminal, the second video of the plurality of videos;
receiving, by the first terminal, second video segments of the second video of the plurality of videos instead of receiving remaining segments of the first video segments, the second video segments corresponding to a second track of the multi-track video;

sequentially transferring, by the first terminal, the second video segments to the player for displaying the sequentially transferred second video segments;

generating, by the first terminal, a link for accessing at least the first track and the second track, the link including history information about at least one transition between the first track and the second track that is stored in a desired metadata format, the history information including information identifying a play order of at least one video segment of the first video and at least one video segment of the second video and time information related to the first track when the first track playback was interrupted by the transition to the second track; and transferring, by the first terminal, the generated link to a second terminal such that the second terminal performs the transition using the history information by receiving video data of the multi-track video in an order associated with the history information.

2. The method of claim 1, wherein each of the plurality of videos includes a start point and an end point and the video segments of each of the plurality of videos are synchronized according to a play order, and in response to a selection of the second track at the player, the sequentially transferred second video segments of the second track are continuously played at a start point of the second video, the continuously playing including transitioning from an end point of a currently played segment of the first video segments when the currently played segment is completed to the start point of the second video.

3. The method of claim 1, further comprising:

storing updated history information about a plurality of transitions between a plurality of tracks of the multi-track video in the desired metadata format; and generating an updated link comprising the updated history information; and transmitting the updated link to the second terminal such that the second terminal accesses the plurality of tracks through the updated link and displays the plurality of tracks according to the updated history information.

4. The method of claim 1, further comprising:

providing, in response to a termination in a play time of the first video, information indicating a termination in playing the first video; and determining to one of (i) re-play the first video from a start of the first video, (ii) play the second video, and (iii) play the first video from a desired play location of the first video.

5. The method of claim 1, further comprising:

seeking a desired video segment corresponding to a desired play location of a desired one of the plurality of videos in response to a request from the player for the desired play location;

receiving the desired video segment and a plurality of video segments that follow the desired video segment; and sequentially transferring the received video segments to the player.

6. The method of claim 1, wherein each of the plurality of videos includes a track-by-track advertisement segment, and the method further comprises:

providing a first track-by-track advertisement segment corresponding to the first video when at least one segment of the first video segments is played; and providing a second track-by-track advertisement segment corresponding to the second video when at least one segment of the second video segments is played.

7. The method of claim 1, wherein each of the plurality of videos corresponds to one of a plurality of thumbnails and a set of the plurality of thumbnails is displayed while one of the plurality of videos is played.

8. The method of claim 1, wherein the first video segments are received through a single data flow and the second video segments are received through the single data flow.

9. A non-transitory computer-readable medium storing program code, which when executed by at least one processor, causes the at least one processor to:

receive a request for multi-track video, the multi-track video including a plurality of videos, each of the plurality of videos corresponding to a track, each of the plurality of videos being divided into time-based video segments;

request a first video of the plurality of videos, the first video corresponding to a first track of the multi-track video;

receive first video segments corresponding to the first video;

sequentially transfer the first video segments to a player for displaying the sequentially transferred first video segments;

receive a user input requesting a second video of the plurality of videos;

request the second video of the plurality of videos;

receive second video segments of the second video of the plurality of videos instead of receiving remaining segments of the first video segments, the second video segments corresponding to a second track of the multi-track video;

sequentially transfer the second video segments to the player for displaying the sequentially transferred second video segments;

generate a link for accessing at least the first track and the second track, the link including history information about at least one transition between the first track and the second track that is stored in a desired metadata format, the history information including information identifying a play order of at least one video segment of the first video and at least one video segment of the second video and time information related to the first track when the first track playback was interrupted by the transition to the second track; and transfer the generated link to a terminal such that the terminal performs the transition using the history information by receiving video data of the multi-track video in an order associated with the history information.

10. A terminal for playing multi-track video content comprising:

a memory having computer readable instructions stored thereon; and at least one processor configured to execute the computer readable instructions to, receive a request for multi-track video content from a player, the multi-track video including a plurality of videos, each of the plurality of videos corresponding to a track, each of the plurality of videos being divided into time-based video segments, request a first video of the plurality of videos based on the received request, the first video corresponding to a first track of the multi-track video, receive first video segments corresponding to the first video, sequentially transfer the first video segments to the player for displaying the sequentially transferred first video segments, receive a user input requesting a second video of the plurality of videos, request the second video of the plurality of videos, receive second video segments of the second video of among the plurality of videos instead of receiving remaining segments of the first video segments, the second video segments corresponding to a second track of the multi-track video, sequentially transfer the second video segments to the player for displaying the sequentially transferred second video segments, generate a link for accessing at least the first track and the second track, the link including history information about at least one transition between the first track and the second track that is stored in a desired metadata format, the history information including information identifying a play order of at least one video segment of the first video and at least one video segment of the second video and time information related to the first track when the first track playback was interrupted by the transition to the second track, and transfer the generated link to a second terminal such that the second terminal performs the transition using the history information by receiving video data of the multi-track video in an order associated with the history information.

11. The terminal of claim 10, wherein each of the plurality of videos includes a start point and an end point and each of the plurality of videos are synchronized according to a play order, and in response to a selection of the second track at the player, the sequentially transferred second video segments of the second track are continuously played at a start point of the second video, the continuously playing including transitioning from an end point of a currently played segment of the first video segments when the currently played segment is completed to the start point of the second video.

12. The terminal of claim 10, wherein the at least one processor is further configured to:

store, in a non-transitory computer readable medium, updated history information about a plurality of transitions between a plurality of tracks of the multi-track video in the desired metadata format;

generate an updated link comprising the updated history information; and transmit the updated link to the second terminal such that the second terminal accesses the plurality of tracks through the updated link and displays the plurality of tracks according to the updated history information.

13. The terminal of claim 10, the at least one processor is further configured to:

provide, in response to a termination in a play time of the first video, information indicating a termination in playing the first video; and determine to one of (i) re-play the first video from a start of the first video, (ii) play the second video, and (iii) play the first video from a desired play location of the first video.

14. The terminal of claim 10, wherein the at least one processor is further configured to:

seek a desired video segment corresponding to a desired location of a desired one of the plurality of videos in response to a request from the player for the desired location; and receive the desired video segment and video segments followed by the desired video segment; and sequentially transfer the received video segments to the player.

15. The terminal of claim 10, wherein each of the plurality of videos includes a track-by-track advertisement segment, and the at least one processor is further configured to:

transfer a first track-by-track advertisement segment corresponding to the first video when at least one segment of the first video segments is played; and transfer a second track-by-track advertisement segment corresponding to the second video when at least one segment of the second video segments is played.

16. The terminal of claim 10, wherein the first video segments are received through a single data flow and the second video segments are received through the single data flow.

17. A file distribution system, comprising:

at least one processor configured to execute computer readable instructions to, store and manage an installation file for installing an application, and transmit the installation file to a first terminal in response to a request of the first terminal; and the application configuring the first terminal to, transmit a request for a multi-track video to a proxy server, the multi-track video including a plurality of videos and each of the plurality of videos being divided into time-based video segments and being stored in a content server, receive, from the proxy server, first video segments corresponding to a first video of the plurality of videos, the first video corresponding to a first track of the multi-track video, play the first video of the first track as the first video segments are received from the proxy server, the proxy server receiving the first video segments from the content server, receive a user input requesting a second video of the plurality of videos, request the second video of the plurality of videos in response to the user selection of the second video, the second video corresponding to a second track of the multi-track video, receive, from the proxy server, second video segments of the second video, play the second video of the second track as the second video segments are received from the proxy server, the proxy server receiving the second video segments from the content server, generate a link for accessing at least the first track and the second track, the link including history information about at least one transition between the first track and the second track that is stored in a desired metadata format, the history information including information identifying a play order of at least one video segment of the first video and at least one video segment of the second video and time information related to the first track when the first track playback was interrupted by the transition to the second track, and transfer the generated link to a second terminal such that the second terminal performs the transition using the history information by receiving video data of the multi-track video in an order associated with the history information.

18. The file distribution system of claim 17, wherein each of the plurality of videos includes a start point and an end point, the video segments of each of the plurality of videos are synchronized according to a play order, and the application further configures the first terminal to:
  play the second video segments based on a start point of the second video and an end point of a segment of the first video segments, the playing including transitioning from the end point of the segment of the first video segments to the start point of the second video in response to a selection of the second track.

* * * * *